United States Patent
Garcia

(10) Patent No.: US 9,363,692 B2
(45) Date of Patent: *Jun. 7, 2016

(54) METHOD AND APPARATUS FOR DETERMINING THE CONFIGURATION OF A CELLULAR TRANSMISSION SYSTEM

(71) Applicant: Keysight Technologies, Inc., Minneapolis, MN (US)

(72) Inventor: Francisco Javier Garcia, Fife (GB)

(73) Assignee: Keysight Technologies, Inc., Santa Rosa, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 14/231,536

(22) Filed: Mar. 31, 2014

(65) Prior Publication Data

US 2015/0281983 A1    Oct. 1, 2015

Related U.S. Application Data

(63) Continuation-in-part of application No. 13/781,124, filed on Feb. 28, 2013.

(51) Int. Cl.
*H04W 24/00* (2009.01)
*H04W 24/06* (2009.01)
*H04W 4/06* (2009.01)
*H04W 56/00* (2009.01)

(52) U.S. Cl.
CPC ............... *H04W 24/06* (2013.01); *H04W 4/06* (2013.01); *H04W 56/001* (2013.01)

(58) Field of Classification Search
None
See application file for complete search history.

(56) References Cited

U.S. PATENT DOCUMENTS

2005/0002330 A1   1/2005  Cave
2007/0116046 A1*  5/2007  Liu ..................... H04J 3/1617 370/466
2009/0207853 A1*  8/2009  Mueller-Weinfurtner ........ H04L 27/2647 370/465
2009/0290632 A1* 11/2009  Wegener ................ H03M 7/30 375/240
2010/0016013 A1*  1/2010  Kabashima ........... H04W 88/00 455/552.1
2010/0067426 A1   3/2010  Voschina et al.
2010/0074121 A1*  3/2010  Sakama ................ H04W 24/00 370/248
2010/0075678 A1   3/2010  Akman et al.
2011/0294497 A1  12/2011  Hedlund et al.
2013/0003677 A1   1/2013  Yu (Continued)

FOREIGN PATENT DOCUMENTS

WO    2013/057575 A1    4/2013
WO    2013/096585 A1    6/2013

OTHER PUBLICATIONS

Search Report dated Mar. 14, 2014, Application No. GB1319830.4.

(Continued)

*Primary Examiner* — Robert C Scheibel

(57) ABSTRACT

A method for operating a data processing system to determine the operational parameters of a communication system between an REC and an RE that utilizes a CPRI data link for communication. The data processing system is synchronized with the CPRI frames and determines a plurality of CPRI frame characteristics from the CPRI frames by examining a plurality of predetermined locations in the CPRI frames. The plurality of CPRI frame characteristics for one or more of the CPRI frames, and a first model of the communication system are used to generate a first broadcast frame that would be generated by the one or more CPRI frames if the first model accurately described the communication system. The first broadcast frame is tested to determine if the first broadcast frame is consistent with the first model. If the broadcast frame is inconsistent, a new model is chosen and the process repeated.

20 Claims, 11 Drawing Sheets

(56) References Cited

U.S. PATENT DOCUMENTS

| | | |
|---|---|---|
| 2013/0260773 A1 | 10/2013 | Arthur et al. |
| 2013/0294419 A1 | 11/2013 | Heiser et al. |
| 2014/0003333 A1* | 1/2014 | Ivershen ............... H04W 24/08 370/328 |

OTHER PUBLICATIONS

Combined Search and Examination Report dated Aug. 24, 2015, UK Intellectual Property Office, Application No. GB1505000.8.

Notice of Allowance dated Oct. 13, 2015 in U.S. Appl. No. 13/781,124.

* cited by examiner

METHOD AND APPARATUS FOR DETERMINING THE CONFIGURATION OF A CELLULAR TRANSMISSION SYSTEM

RELATED APPLICATIONS

This application is a continuation-in-part of U.S. patent application Ser. No. 13/781,124 filed on Feb. 28, 2013 and claims priority therefrom. Further, that patent application is incorporated herein by reference in its entirety.

BACKGROUND

Passive monitoring systems for communications between transmitters in cellular telephone systems are used by operational support system providers to monitor the traffic and sometimes the content of the communications on such transmitters, referred to as user equipment (UE) in the following discussion.

Ideally, monitoring is performed without the active participation of the cellular provider or the UE that is being monitored so that the cellular provider does not need to alter its operation during monitoring. Hence, the monitoring system preferably taps into the data flow between the cellular system and the UE. Monitoring systems for communications in earlier cellular systems tapped a point in the data flow that is no longer available in 4G networks. In addition, the data that is available in 4G networks is in the form of baseband carrier data that encodes the entire set of transmissions between the cellular transmitter and all of the UE in a cell in a manner that can be easily utilized by a radio head transmitter without introducing delays into the transmissions. To monitor any particular transmission, the monitoring system must know the manner in which the communication link that is available for tapping is organized. This organization can vary from cell to cell in a system, and hence, must be discovered by the monitoring system if the cooperation of the cellular provider is to be avoided.

Remote radio heads and remote radio head controllers use a Common Public Radio Interface (CPRI) that typically goes through a set of initialization stages when first connected together to negotiate a number of important characteristics of the communication link, such as line rate, CPRI word length, number of antenna carriers, IQ sample size for downlink and uplink, and type of padding. While systems that monitor the startup phase can be used to provide the needed information on the organization of the data flow, these systems must have a probe in place during the startup phase of the system. Since a passive CPRI probe may be connected to such interfaces at any time after the system has been configured, it cannot be assumed that the probe will observe this initial negotiation phase to determine the needed parameters. Thus a probe that can learn these parameters from the observed byte stream is needed.

In addition, the probe must also learn the type of communication system that is being implemented using the CPRI frames to encapsulate the data that determines the broadcast frames that are broadcast by the cell antennae. CPRI encapsulation is used to implement radio communications that satisfy a number of different communication models. Exemplary communication systems include "long term evolution systems" (LTE), communication systems, "Universal Telecommunications systems" (UMTS), and "Global Systems for Mobile Communications" (GSM). Each of these systems map the data that defines radio frames that are utilized by the UE in a different manner. Hence, without knowing which communication system is being implemented, the probe cannot fully decode the transmissions.

SUMMARY

The present invention includes a method for operating a data processing system to determine the operational parameters of a communication system which includes a Radio Equipment Control (REC) and a Radio Equipment (RE) that communicate with one another over a data link utilizing CPRI frames. The RE transmits and receives broadcast frames. The method of the present invention includes synchronizing the data processing system with the CPRI frames and determining a plurality of CPRI frame characteristics from the CPRI frames by examining a plurality of predetermined locations in the CPRI frames. The plurality of CPRI frame characteristics for one or more of the CPRI frames, and a first model of the communication system are used to generate a first broadcast frame that would be generated by the one or more CPRI frames if the first model accurately described the communication system. The first broadcast frame is tested to determine if the first broadcast frame is consistent with the first model.

In one aspect of the invention, CPRI frames are searched for a first byte in a data stream on the data link that determines a hyper-frame boundary. Predetermined locations relative to the first byte are examined to determine the number of bytes between the hyper-frame boundary and the first byte of a subsequent CPRI frame on the data link. CPRI frame characteristics that are independent of the first model are then determined, such as the CPRI line bit rate used in transmissions on the data link and the number of antenna carriers.

In another aspect of the invention, providing the first broadcast frame includes extracting IQ data values that depend on the first model from one of the CPRI frames, and determining symbols specified by the extracted IQ data values that would be transmitted by the first broadcast frame if the first model accurately describes the communication system. The determined symbols can include symbols in the first broadcast frame that allow a UE in a cell transmitting the first broadcast frame to synchronize the UE with transmissions from the cell.

In yet another aspect of the invention, testing the first broadcast frame includes determining symbols in the first broadcast frame and comparing the determined symbols with a value encoded in a control block in one of the CPRI frames.

If the first broadcast frame is not consistent with the first model, a second model for the communication system that is different from the first model is chosen. Using the plurality of CPRI frame characteristics, and the second model, a second broadcast frame that would be generated by the one or more CPRI frames if the second model accurately described the communication system is determined. The second broadcast frame is then tested to determine if the second broadcast frame is consistent with the second model.

DETAILED DESCRIPTION

Figure 1:
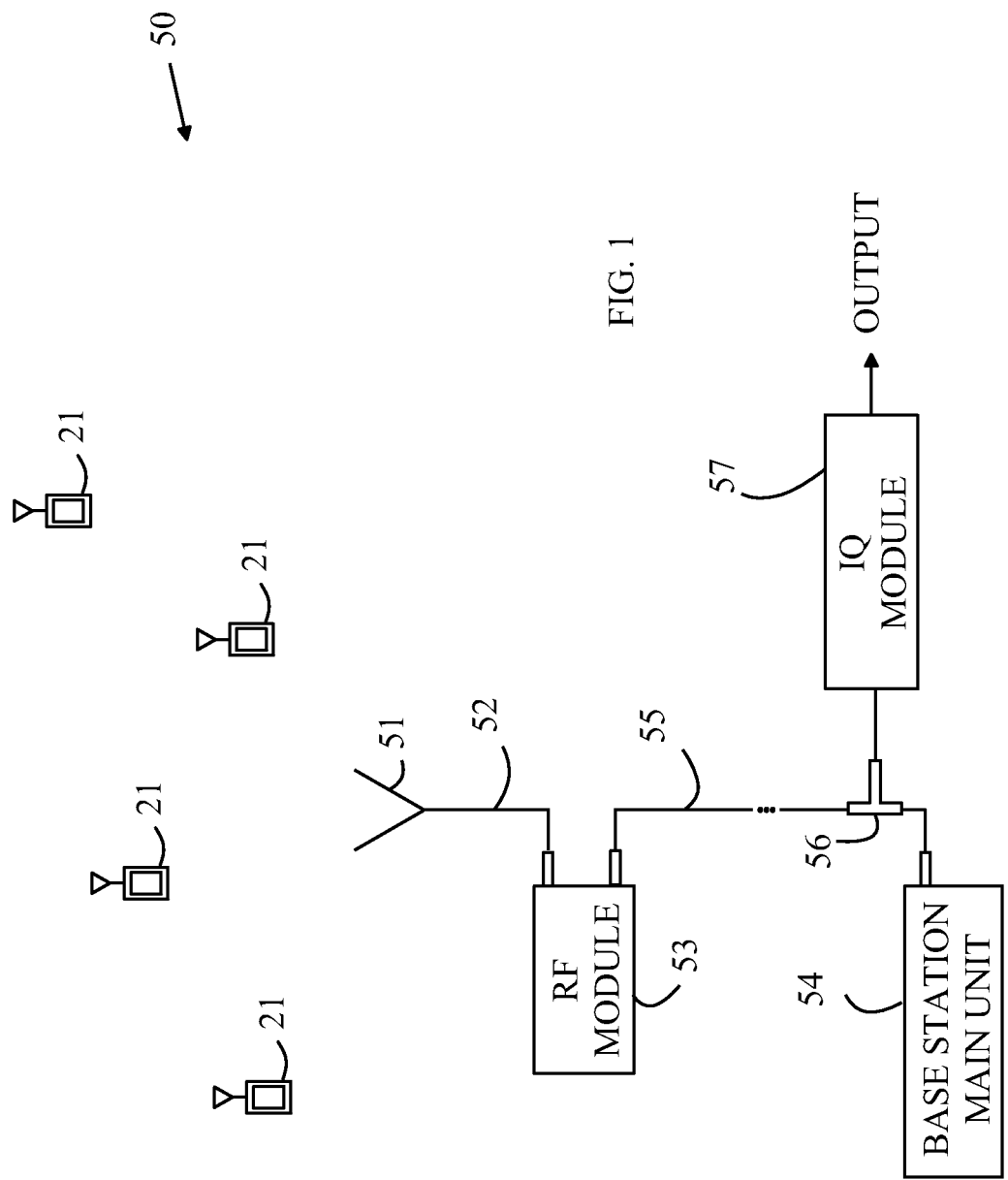
FIG. 1 illustrates the manner in which an IQ Monitor (IQM) according to the present invention is inserted into the communication link between an RF module and an REC module.

The manner in which the present invention provides its advantages can be more easily understood with reference to a particular communication system. The manner in which the present invention can be extended to other communication systems will then be discussed in more detail. An LTE cellular network is a type of 4G cellular network. The communications between the network interface to a cell and the UE are separated into a baseband digital processing function and the actual RF functions of the antenna system such as filtering, modulation of the carrier for the cell in question, frequency conversion and amplification. These functions are separated into two modules, an REC module that performs the digital processing function for generating a digital stream that is transmitted to the UE after upconversion and an RE module that provides the RF functions and interfaces to the UEs through the cell antennae. An RE module is located in each cell. The RE module is connected by high-speed point-to-point serial links to the REC module that is typically at a location that is remote from that of the RE.

The REC module and RE module exchange data in a first framed format that includes a temporal sequence of digital in-phase and quadrature (IQ) baseband data. In essence, the REC module generates a digital data stream consisting of the IQ baseband values that, after upconversion, are to be transmitted by the RE module. Similarly, the RE module downconverts the received signals from the cell to a stream of IQ baseband values. For the purpose of this discussion, IQ baseband values are defined as a sequence of IQ values occupying a frequency band with a center frequency at or near DC. In addition, control data are multiplexed onto the high-speed digital bus within the frames. Two standards have been proposed for the communications between the REC modules and the RE modules. These are commonly referred to as the CPRI and the Open Base Station Architecture Initiative (OBSAI).

From the point of view of the UE in the cell, the transmitted IQ values form a sequence of frames having a plurality of adjacent frequency bands in which each frequency band is used to transmit or receive a sequence of digital symbols. These frames will be referred to as "LTE" frames in the following discussion. The data for each LTE frame is provided in a corresponding CPRI frame. In the present invention, a cell monitor function is implemented by inserting an IQM into the digital link between the REC module and the RE module using a passive splitter. The IQM has access to all of the baseband data, and hence, can monitor the communications to and from any UE being serviced by the RF transmitter in the cell without requiring downconversion of the RF signals. In addition, the present invention takes advantage of the known protocols for data exchanges between the UE and REC modules, and hence, the present invention can selectively demodulate and decode the baseband to access the data for a UE of interest without having to demodulate and decode the entire CPRI frame.

Refer now to FIG. 1, which illustrates the manner in which IQM 57 according to the present invention is inserted into the communication link between an RF module and an REC module. In cell 50, the function of the traditional transmission node between the cellular system and UE 21 is provided by antenna 51, RF module 53, and base station main unit 54. RF module 53 is connected to antenna 51 via an RF link 52. RF module 53 is connected to base station main unit 54 by digital link 55. RF module 53 provides the functions of the RE module discussed above, and base station main unit 54 provides the functions of the REC module discussed above. A passive splitter 56 is introduced into digital link 55.

Passive splitter 56 will in general be of a type that depends on the nature of digital link 55. For example, if digital link 55 is an optical link, an optical splitter is preferred. Such optical or electrical splitting is common practice in modern networks, and hence, will not be discussed in detail here.

As noted above, the data on digital link 55 is in the form of CPRI frames, and the transmitted data on antenna 51 is organized as LTE frames. The CPRI frames also include some control words whose functions will be discussed in detail below. The corresponding LTE frame can be viewed as a plurality of sub-carrier frequencies. The sub-carriers include a set of sub-carriers that are used to send 140 symbols corresponding to each CPRI frame. The manner in which the remaining sub-carriers are used will be discussed in more detail below. Each symbol is sent in a predetermined time period. Given a time period, the CPRI frame corresponding to the LTE frame, and the structure of the CPRI frames and LTE system, a set of IQ time domain values in the CPRI frame can be identified. If this set is subjected to a fast Fourier transform (FFT), the contents of each sub-carrier can be ascertained for the time period in question without requiring that the IQ samples for other time periods be demodulated.

To monitor the LTE communications in an IQM, the IQM must be able to identify frames on the CPRI link, know the structure of those frames, and know the structure of the LTE system that is utilizing those frames. While these structures are known to the REC and RE modules, these structures are not necessarily known by the IQM when the IQM is first connected to digital link 55 discussed above. Hence, the IQM must be able to obtain this information by observing the traffic on digital link 55.

The observable signals on the link between RF module 53 and base station main unit 54 are digital values that are organized into CPRI frames. Each CPRI frame includes some control words and sequences of I and Q values that are to be transmitted by RF module 53 after being upconverted in frequency to the correct frequency band corresponding to antenna 51. Similarly, CPRI frames from RF module 53, after being downconverted to baseband data, are organized as sequences of I and Q values that have been received from the UE within the cell. This baseband data is returned to base station main unit 54 where the data is demodulated to determine the symbols sent by the UEs in the cell during the time period corresponding to the CPRI frame in question.

As noted above, the data communicated in the CPRI frames defines a sequence of frequency channels in which each channel sends or receives digital data in the form of "symbols" over the time frame of each CPRI frame. The symbols are sent serially on each channel. Each symbol is sent in a time "slot" on the frequency in question. The frequencies form a broad band of frequencies, and hence, will be referred to as sub-carriers in the following discussion. During any one CPRI frame, each channel sequentially receives or sends a plurality of symbols.

From a monitoring point of view, IQM is interested in a specific subset of the symbols being sent and received by RF module 53. In general, there are a number of symbols of interest in each frame. The problem of accessing these symbols without decoding the entire frame can be reduced to determining a time period in the frame in which at least one of the symbols of interest is being sent or received, determining the subset of IQ values corresponding to that time period in the frame, and then applying an FFT to that subset of IQ values to determine the symbols sent in each sub-carrier at that time. In general, there will be multiple symbols of interest at the time in question, since the sub-carriers are allocated blocks of adjacent sub-carriers as will be explained in more detail below.

To perform this function, the IQM must "know" a number of parameters that determine the organization of the LTE frames and the corresponding CPRI frames. The structural organization of the LTE frames and CPRI frames varies from cell to cell in a network. For example, different LTE cells utilize different numbers of sub-carriers. The corresponding number of IQ samples and size of the FFT depend on the number of sub-carriers. These parameters will be discussed in more detail below. For the purpose of the present discussion, it is sufficient to note that these parameters must be determined by viewing the CPRI frames, which have an organization that does not lend itself to a simple analysis.

In addition, to monitor communications between a specific UE and the cellular system, the allocation of sub-carriers and slots in any given frame that are directed to that UE must be determined. This determination is made by monitoring specific dedicated channels that specify the allocation of sub-carriers and slots in the various frames. The details of these monitoring functions are not central to the present invention, and hence, will not be discussed in detail here. The reader is directed to U.S. patent application Ser. No. 13/433,173 filed on Mar. 28, 2012, which is hereby incorporated in its entirety by reference and which discusses these monitoring functions in detail.

The manner in which the present invention provides its advantages can be more easily understood with reference to the structure of the CPRI frames and the LTE frames, since translation between the data in these types of frames is essential to the operation of an IQM. Communications in the LTE system are sent utilizing a frequency band that is divided into a contiguous block of sub-carrier frequencies. Each sub-carrier is used to send or receive a sequence of symbols, each symbol occupying a predetermined time slot on the sub-carrier in question. A symbol is a digital value between 0 and N−1. The corresponding transmission on the sub-carrier in question is contained in a sequence of IQ values that are transmitted during the time slot in question. These sequences of IQ values are communicated on the link between the REC and RE components discussed above. Hence, to decode a symbol corresponding to a given sub-carrier and time slot, the IQM must know where the sequence of IQ values that define that symbol is located in the CPRI frame. In general, the sequence of IQ values will determine a symbol in all of the sub-carriers. The sequence in question is converted to the symbols in the various sub-carriers using an FFT. Accordingly, an IQM must know the number of sub-channels in the structure of the specific LTE configuration in the cell being monitored and the structure of the corresponding data in the CPRI frames.

To decipher the setup of the LTE system, the present invention must first determine the structure of the LTE system that is receiving the CPRI frames. To simplify the following discussion it will be assumed that there are four channel models corresponding to bandwidths of 5 MHz to 20 MHz in increments of 5 MHz. The manner in which the present invention can be expanded to deal with other channel models will be apparent from the following discussion. Each band is divided into a plurality of sub-carriers. Some of these sub-carriers have fixed functions, while others are allocated on a frame-by-frame basis for communications with specific UE. These parameters of the various LTE systems are summarized in Table 1, below.

TABLE 1

| Channel Bandwidth | 5 MHz | 10 MHz | 15 MHz | 20 MHz |
| --- | --- | --- | --- | --- |
| No. of Sub-carriers | 300 | 600 | 900 | 1200 |
| No. of Resource Blocks | 25 | 50 | 75 | 100 |
| Sampling Rate (MHz) | 7.68 | 15.36 | 23.04 | 30.72 |
| FFT Size (payload) | 512 | 1024 | 1536 | 2048 |
| Data sub-carriers (+DC sub-carrier) | 300 | 600 | 900 | 1200 |
| Guard sub-carriers | 212 | 424 | 636 | 848 |
| Cyclic Prefix Length | | | | |
| Normal | 40/36 | 80/72 | 120/108 | 160/144 |
| Extended | 128 | 256 | 384 | 512 |
| Samples per Slot | 3840 | 7680 | 11520 | 15360 |
| Total samples per 10 ms | 76800 | 153600 | 230400 | 307200 |

For example, for a 20 MHz bandwidth model, there are 1200 sub-carriers. Data is decoded from a sequence of 2048 IQ time samples to arrive at the symbols in 1200 sub-carriers by performing an FFT on time samples taken at the indicated sampling rate. In addition, there are a number of "guard sub-carriers" whose functions will be discussed in more detail below. Each slot is represented by 15360 IQ samples in a CPRI frame. These samples are divided into the samples that provide the symbol values and various other bits whose functions will be discussed in more detail below. Given that the IQM needs to examine the symbols at a specific slot, the IQM must be able to determine the location of the IQ time samples within the frame that corresponds to the slot in question, and hence, must know the details of these other bit allocations.

While the minimum data entry of interest is a symbol in a particular time slot on a particular carrier, the minimum data capacity that is allocated to a function or user is a "resource block" (RB) which corresponds to a plurality of contiguous sub-carriers and a plurality of symbols on each of those sub-carriers. Since the details of the data allocations are not central to the present invention, the structure of such transmissions between the cellular system and the UE will not be discussed in detail here.

Figure 2:
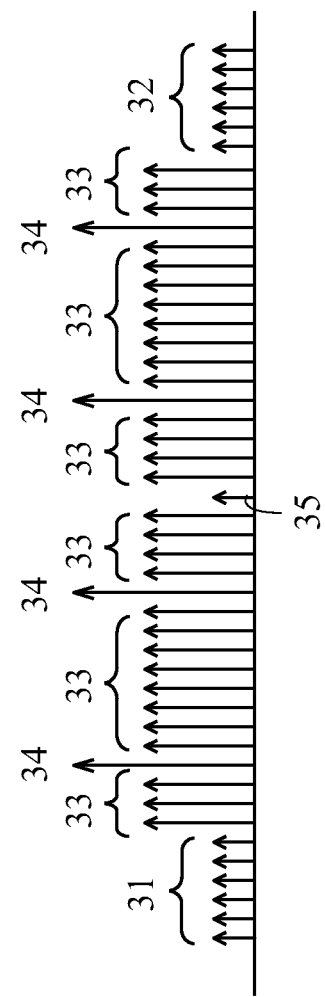
FIG. 2 illustrates the division of the band in the frequency domain.

To provide protection against interference from neighbouring cells in a cellular system, the sub-carriers at the high and low ends of the channel are not used for data. These sub-carriers will be referred to as guard sub-carriers in the following discussion. In addition, a number of reference/pilot sub-carriers are reserved, and hence, are not available for transmitting data. The various sub-carriers are shown in FIG. 2, which illustrates the division of the band in the frequency domain. The lower and upper guard sub-carriers are shown at 31 and 32, respectively. Exemplary reference/pilot sub-carriers are shown at 34. A DC sub-carrier that is also used as a pilot/reference sub-carrier is shown at 35. Finally, the data sub-carriers are shown at 33. As will be discussed in more detail below, these reference sub-carriers can be used in determining the specific LTE configuration that is being utilized by the RE, as some of these sub-carriers have locations that are different for different LTE configurations.

Figure 3:
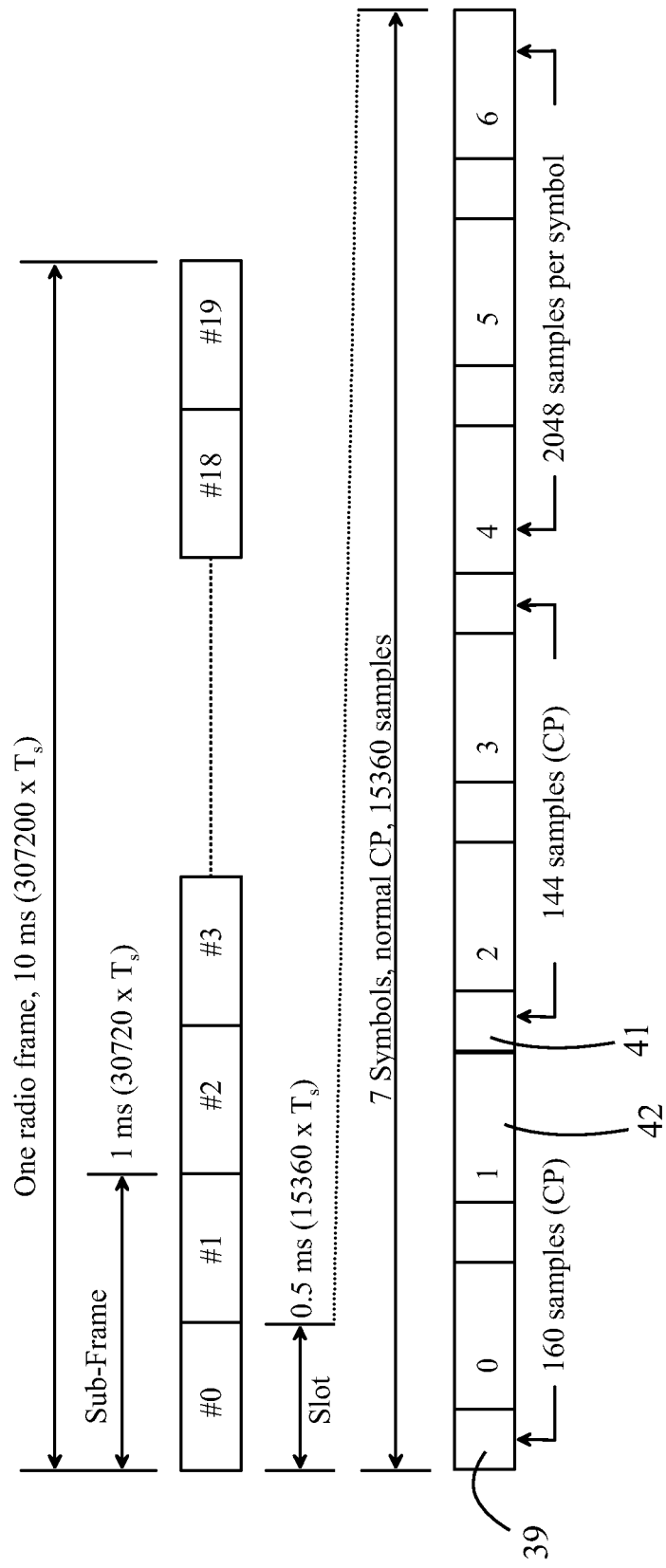
FIG. 3 illustrates the organization of an LTE data frame having a 20 MHz bandwidth.

Refer now to FIG. 3, which illustrates the organization of an LTE data frame having a 20 MHz bandwidth. Each frame is 10 ms long and is divided into ten sub-frames. Each sub-frame is, in turn, divided into two "slots". Hence, there are 20 slots in each frame. Each slot, in turn, is used to send a plurality of symbols. The number of symbols depends on the manner in which the symbols are augmented to protect against inter-symbol interference.

In the time domain, a form of guard band is also utilized to reduce inter-symbol interference. A cyclic prefix (CP) is added to the beginning of each time period as shown at 39 and 41. The CP is just a repeat of a number of samples from the end of the samples representing the symbol. The size of the CP is different for the first symbol of a slot. In the example shown in FIG. 3, 160 samples are used in the first slot, and 144 samples are used in each of the remaining slots. The number of samples in the CP depends on both the bandwidth of the LTE system and the type of CP used (normal or extended). In addition, the number of symbols per slot depends on the type of CP in use. For example, in a 20 MHz LTE system that utilizes the extended prefix, only six symbols are sent in each slot. In contrast, if the normal CP is used, seven symbols are sent in each slot.

The time domain IQ samples that communicate the actual symbol values are shown at 42. For a 20 MHz bandwidth system, there are 2048 samples that define the symbol at that particular time in each of the sub-carriers. In the instant example, there are 2048 such samples corresponding to the 1200 sub-carriers and 848 guard sub-carriers. The period, Ts, is the basic time unit of the system and all other time periods are multiples of Ts. For LTE, Ts=1/30.72 µs.

Figure 4:
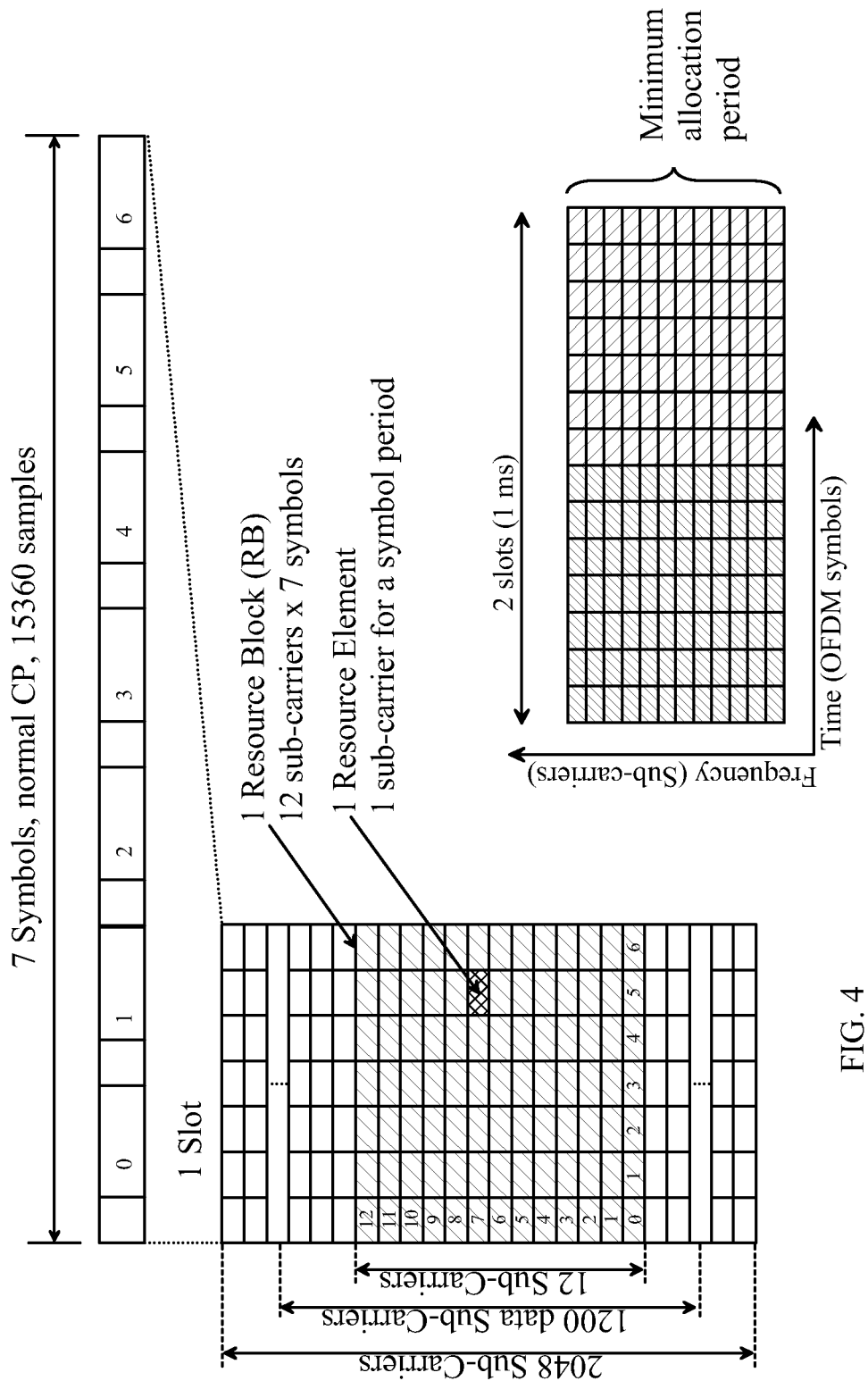
FIG. 4 illustrates the relationship between resource blocks and resource elements.

Refer now to FIG. 4, which illustrates the relationship between RBs and resource elements. Transmissions in LTE are scheduled in units of RBs which for normal mode CP represent 12 consecutive sub-carriers by seven symbols in time. An RB occupies one slot. This represents a nominal bandwidth of 180 kHz for a duration of 0.5 ms or one slot as described earlier. A resource element is the smallest defined unit which consists of one sub-carrier during one symbol interval. It should be noted that CPs have been excluded from the figure. Thus the 2048-point FFT generates 1024 sub-carriers of which 1200 are used as data carriers on either side of the DC carrier, and the rest are used as guard sub-carriers as explained above. The minimum possible capacity allocation period for both uplink and downlink in LTE systems is 1 ms, which corresponds to two RBs within a single sub-frame. Thus resources are allocated over two consecutive RBs within the same sub-frame.

To monitor any particular UE communications, the IQM must know the RBs that are utilized for those communications. It should be noted that those RBs change from LTE frame to frame. When a UE initiates contact with the cellular system, the UE sends messages on predetermined channels that occupy particular resource elements in each frame. The UE is given an identification number which is used in the various communications. The UE monitors particular channels for messages directed to that UE. Each channel has a predetermined set of resource elements in each frame. When the UE is to receive data, the cellular system sends the identification of a future frame and RBs in that frame in which that data is to be sent to the UE. The UE then decodes those RBs in the identified frame. Similarly, when the UE wishes to send data, it makes a request on a predetermined channel and the system sends it a message indicating the RBs and frames on which it is to transmit. As noted above, for the purposes of the present discussion, it is sufficient to note that the IQM can identify resource elements that are to be monitored by first monitoring specific control channels for control communications of interest and then monitoring the resource elements specified in those control communications. Each of these steps identifies one or more resource elements that are encoded in known CPRI frames and requires the IQM to demodulate the IQ data corresponding to those resource elements to obtain the symbols in question.

Hence, an understanding of the CPRI frame structure is needed to extract the information needed by the IQM in decoding the transmissions. The CPRI frames can also have a plurality of structures that must be discovered to determine the location of the IQ data in a CPRI frame for a symbol of interest.

Figure 5:
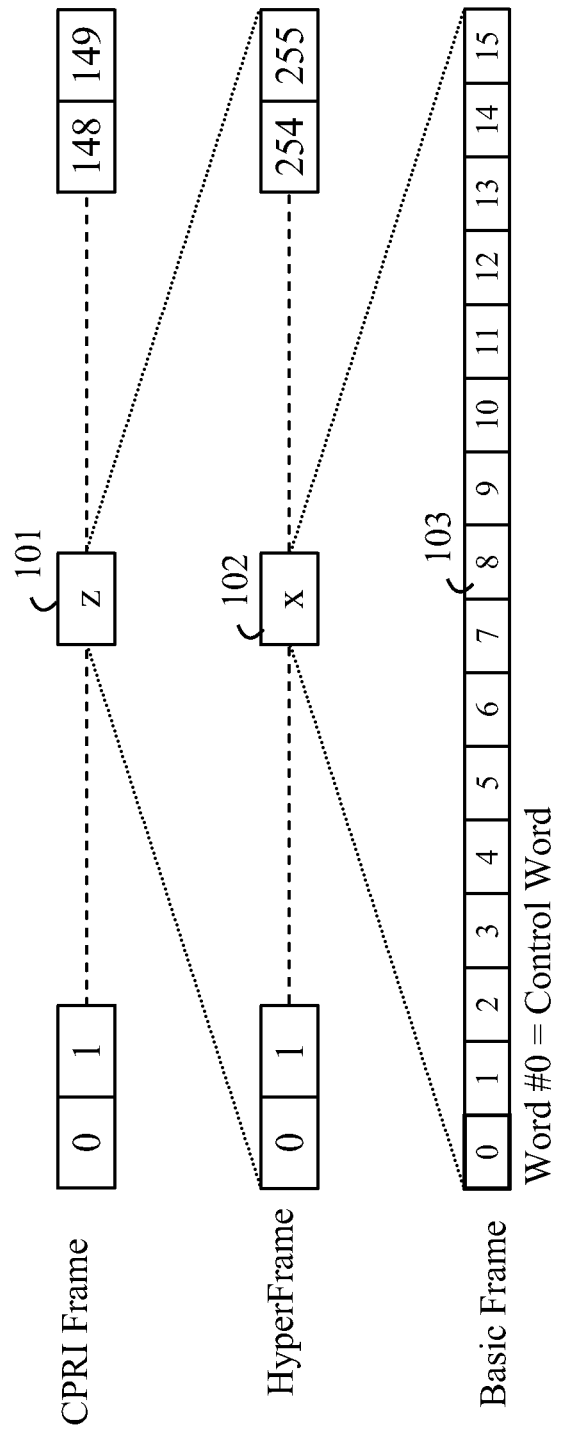
FIG. 5 illustrates the CPRI frame structure that is transmitted on an optical or electrical link as a serialized data stream.

Refer now to FIG. 5, which illustrates the CPRI frame structure that is transmitted on an optical or electrical link as a serialized data stream. The communications are organized into CPRI frames that are sent serially over the link. Since the link is a point-to-point link, the frames do not have headers that specify the source and destination addresses, since these locations are known. Hence, the data observed on a link is a logical encapsulation or packetization of I and Q samples with implied or "abstract" framing.

A CPRI frame is always 10 ms long and abstractly contains 150 hyper-frames 101. Each abstract hyper-frame is made up of 256 basic frames 102. The hyper-frames and basic frames are referred to as abstract hyper-frames and basic frames because there are no headers or trailers associated with these to delineate them. However, to simplify the following discussion, the "abstract" labeled is omitted. Each basic frame 102 is subsequently made up of 16 words 103. The word length is dependent on the line rate that is discussed below. It should be noted that the number of bytes in a CPRI frame depends on this word size, since there are always 150 hyper-frames and 256 basic frames in each hyper-frame. When referring to a specific basic frame in a CPRI frame, a notation in the form z.x.n is used, where z is the hyper-frame number in the CPRI, x is the basic frame number within hyper-frame z, and n is the word number within that basic frame.

The first word of each basic frame is referred to as the "control word". This is the only form of delineation that can be observed in the packetized IQ samples. In one aspect of the present invention, these control words are utilized to identify basic frames in the transmissions on the data link and to synchronize the IQM with the REC.

Figure 6:
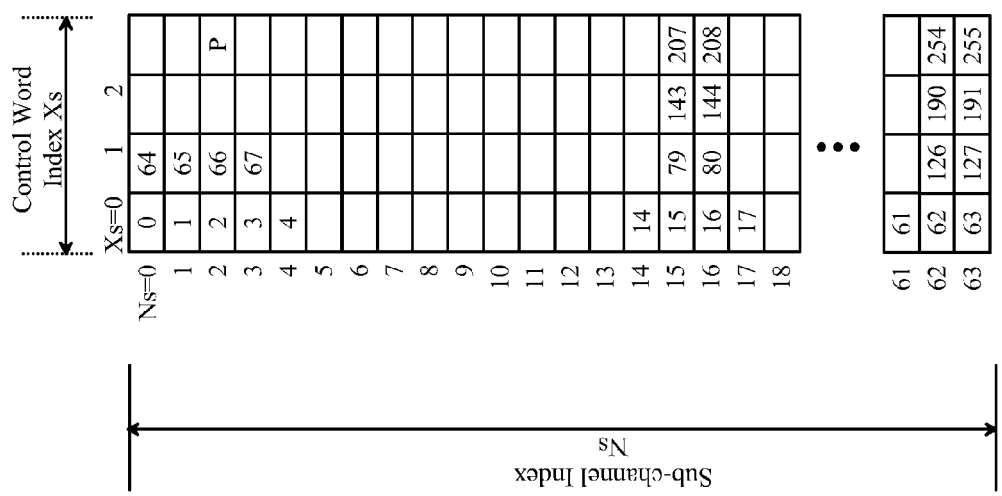
FIG. 6 illustrates the organization of the control block.

The 256 basic frames in each hyper-frame have a collection of 256 control words. The number of control "bytes" in a hyper-frame depends on the word size. These control words form a control block having 64 sub-channels with four control words for each sub-channel. The term control block is defined to be this collection of control words. These sub-channels are shown in FIG. 6, which illustrates the organization of the control block. It should be noted that the control words are not adjacent to one another, but rather distributed throughout the hyper-frame. The index in the hyper-frame of a control word x is given by X=Ns+64*Xs, were Ns is the sub-channel number that runs from 0 to 63, Xs is the word number for that sub-channel that runs from 0 to 3. The index of selected control words is shown in FIG. 6. These control sub-channels are used to support a number of protocols to help establish the CPRI link and synchronize remote radio heads with baseband processing remote radio controllers, maintenance of the link state, vendor specific protocols and space for future extensions. The present invention utilizes sub-channel 0, which carries the "Comma Byte" which is the same for all hyper-frames and other control entries to synchronize the IQM to the REC and extract data needed to determine the structure of the CPRI frames and the corresponding LTE frames.

The CPRI frames between an REC and RE can include multiple IQ data channels in which each IQ stream represents the digital baseband data associated with the transmission and reception of a single wireless carrier at an antenna in the REC. To support such systems, the CPRI frames are divided into IQ data channels. Time Division Multiplexing (TDM) is used to simultaneously support multiple independent IQ streams. Each IQ stream represents the digital baseband data associated with the transmission and reception of a single wireless carrier at an antenna. In the CPRI specifications, these IQ sample streams are referred to as antenna carriers and represent independent IQ data channels. Since the number of antenna carriers varies depending on the specific cellular organization, the IQM must determine if there are multiple antenna carriers and which antenna carrier includes the data of interest. In addition, there may be reserved bits at the end of each CPRI basic frame that are not used for transmitting the antenna carriers.

Figure 7:
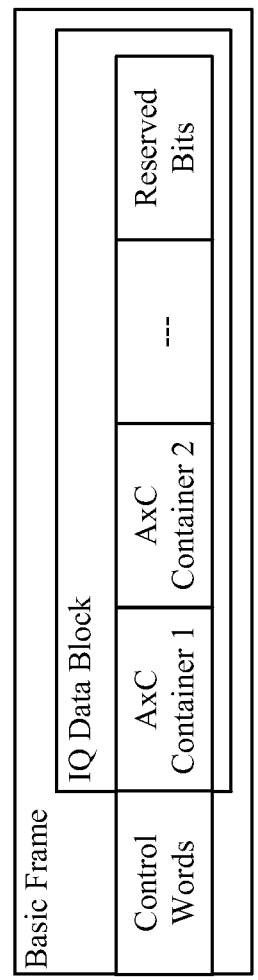
FIG. 7 illustrates a basic frame in which the additional bits are located at the end of each basic frame.

The organization of an exemplary basic frame having multiple antenna carriers is shown in FIG. 7, which illustrates a basic frame in which the additional bits are located at the end of each basic frame. Hence, if there are multiple antenna carriers, the IQM must determine which antenna carrier is being used for the antenna that is communicating with the UE of interest. This further complicates the discovery process.

The number of bits per basic frame that can be used to transport antenna carriers is then dependent on the line rate and word size. These properties are summarized in Table 2, showing line rate, word size and available IQ data blocks in bits. Note that the IQ data block sizes correspond to 15 CPRI words as the first word per basic frame is the control word mentioned earlier. These parameters must be discovered by the IQM.

Antenna carriers or IQ data channels are then multiplexed into these IQ data blocks. The number of carriers per data block is dependent on the sample width used for I and Q values, the frequencies being multiplexed onto the data blocks and of course the capacity of the CPRI line rate in use which determines its IQ data block size.

TABLE 2

Number of IQ bits per basic frame as a function of CPRI line rates

| | Line Rate (Mbps) | | | | | | |
|---|---|---|---|---|---|---|---|
| | 614.4 | 1228.8 | 2457.6 | 3072 | 4915.2 | 6144 | 9830.4 |
| Word Size | 8 | 16 | 32 | 40 | 64 | 80 | 128 |
| IQ Data Block (bits) | 120 | 240 | 480 | 600 | 960 | 1200 | 1920 |

The CPRI specification allows for the use of a number of different mapping methods for different cellular standards as well as how these antenna carriers are packed into the IQ data blocks and how padding is multiplexed in between antenna carriers or at the end of the useful IQ data bits. Equally, equations exist to derive how many samples S, representing I and Q pairs per antenna carrier of a particular wireless standard at a particular frequency are required per basic frame. This latter period is referred to as the duration K in basic frames. To simplify the following discussion, it will be assumed that a dense packing mode is applied and, if stuffing bits are required, they appear at the end of the basic frame. Further, it is assumed that an I and Q sample width of either 16 or 15 bits for the downlink and 8 bits for the uplink are used. While LTE can support bandwidths of 1.25 MHz and 2.5 MHz it is more likely that the bandwidths lie in the 5 to 20 MHz range. If the IQM fails to decode CPRI frames utilizing these assumptions, additional searches can be done as discussed in more detail below. The relationship between S, K, LTE bandwidth, and different numbers of carrier channels is shown in Tables 3 and 4, for I and Q sample widths of 16 and 15 bits in the downlink (DL) direction, respectively.

TABLE 3

Data channels and sample width per basic frame for 16-bit DL I and Q width.

| LTE Bandwidth (MHz) | S | K | Number of AxC per IQ data block, per basic frame | | | | | |
|---|---|---|---|---|---|---|---|---|
| | | | 120 IQ | 240 IQ | 480 IQ | 600 IQ | 960 IQ | 1200 IQ |
| 5 | 2 | 1 | 1 | 3 | 7 | 9 | 15 | 18 |
| 10 | 4 | 1 | — | 2 | 3 | 4 | 7 | 9 |
| 15 | 6 | 1 | — | 1 | 2 | 3 | 5 | 6 |
| 20 | 8 | 1 | — | — | 1 | 2 | 3 | 4 |

TABLE 4

Data channels and sample width per basic frame for 15-bit DL I and Q width.

| LTE Bandwidth (MHz) | S | K | Number of AxC per IQ data block, per basic frame | | | | | |
|---|---|---|---|---|---|---|---|---|
| | | | 120 IQ | 240 IQ | 480 IQ | 600 IQ | 960 IQ | 1200 IQ |
| 5 | 2 | 1 | 2 | 4 | 8 | 10 | 16 | 20 |
| 10 | 4 | 1 | 1 | 2 | 4 | 5 | 8 | 10 |
| 15 | 6 | 1 | — | 1 | 2 | 3 | 5 | 6 |
| 20 | 8 | 1 | — | 1 | 2 | 2 | 4 | 5 |

Taking these considerations into account, Tables 3 and 4 show for the chosen LTE bandwidths the sample size S of the antenna carrier per basic frame period K. For each IQ data block size, they also show the theoretical maximum number of antenna carriers at a given frequency that can be multiplexed per basic frame. For LTE it is clear that K, due to the CPRI basic frame timing characteristics is always one, and S can be derived from the number of samples per 10 ms LTE frame for each of the frequencies. In particular, S is the total number of samples per 10 ms LTE frame as shown in Table 1 divided by the number of basic frames times the number of hyper-frames in each 10 ms in each CPRI frame. For example, the sample size per antenna carrier for a 20 MHz bandwidth LTE system is 8 IQ values.

Figure 8:
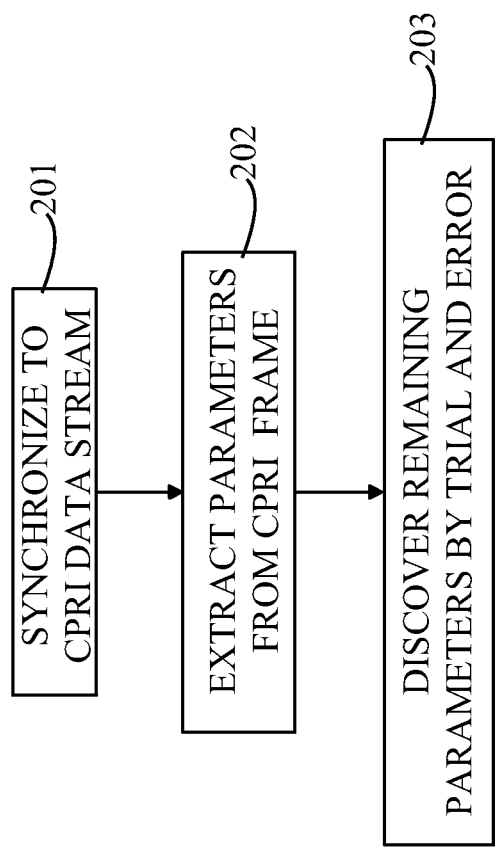
FIG. 8 is a flow chart of the basic method by which the present invention determines the structure of the CPRI frames and LTE frames by observing the data on the CPRI link.

Refer now to FIG. 8, which is a flow chart of the basic method by which the present invention determines the structure of the CPRI frames and LTE frames by observing the data on the CPRI link. In the first step, the IQM synchronizes itself with the CPRI data steam as shown at 201. In the second step, a number of parameters are extracted from the data stream that partially define the structures in question as shown at 202. In the third step, a trial and error discovery process is utilized to extract the remaining parameters as shown at 203.

Figure 9:
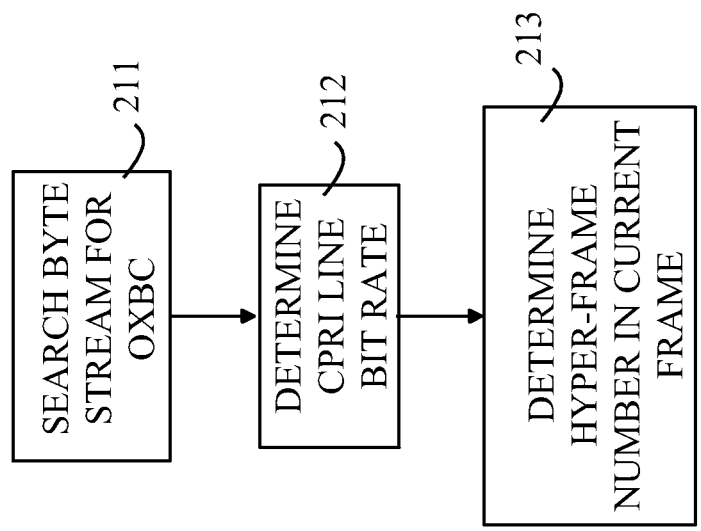
FIG. 9 is a flow chart of step 201.

Refer now to FIG. 9, which is a flow chart of step 201 discussed above. In this step, the data stream on the CPRI communication link is monitored to find a known point within the data stream. Since there are no header records to provide the location in the byte stream of the beginning of a CPRI frame, the present invention looks for a known location in the byte stream from which other useful data can be determined. In one aspect of the present invention, the byte stream is searched for the CB (Comma Byte) value OxBC as shown at 211. As discussed above, this byte is used to delineate hyper-frames. This byte appears at the start of every hyper-frame. However, since there are 150 hyper-frames in each CPRI frame, detecting this byte alone does not define a unique location in the stream. However, by examining the contents of specific bytes following the CB, the CPRI line bit rate can be determined as shown at 212. In addition, the hyper-frame number of the hyper-frame in question can also be determined by examining other locations in the hyper-frame as shown at 213. The hyper-frame number of the current hyper-frame is encoded in the first byte of the control word at the beginning of the 64th basic frame of each hyper-frame. By observing this hyper-frame number, the number of hyper-frames that must be processed until the next full CPRI frame is started can be determined, and hence, the IQM can then be synchronized with the REC.

Figure 10:
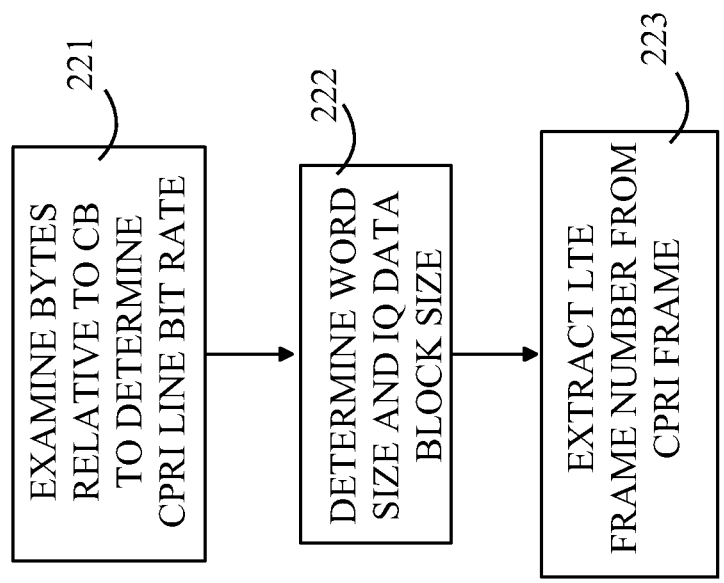
FIG. 10 is a flow chart of step 202.

Refer now to FIG. 10, which is a flow chart of step 202. The contents of bytes following the CB are a function of the CPRI line bit rate and are provided in the CPRI standard, and hence, will not be discussed in detail here. It is sufficient to note that by examining the contents of a predetermined set of words relative to the word containing the CB, the CPRI line bit rate can be unambiguously determined as shown at 221. For example, if a line rate of 2457.6 is being used, each control word will have four bytes. The first byte has BC in hex (i.e., the CB value). The next three bytes will have values 50, C5, and 50 in hex. The IQ values will start after these four bytes. Hence, if this sequence is observed, the line bit rate must be at least 2457.6. If the line bit rate were 4915, the control word would have eight bytes, the first four of which would be BC, 50, C5, 50 followed by 50 repeated four times.

Given the CPRI line bit rate, the word size and IQ data block size are determined as well (see Table 2, above) as shown at 222. Given the word size, the CPRI basic frame size in bytes is given by ((word size/8)*16 words). The IQ data block size is the frame size minus the length of one control word in bytes.

As noted above, some of the parameters needed to monitor the LTE transmissions in a particular sub-carrier and slot need to be determined by trial and error. Hence, data values that can be deduced from the CPRI frame control data and which have corresponding values in the LTE frame sub-carrier and slot structure are useful in the trial and error phase. One such data value is the LTE eNodeB frame number. This number is encoded into the control sub-channel of the CPRI frames and is extracted by the present invention as shown at 223. As will be explained in more detail below, this number is useful in testing assumptions about the structure of the LTE frames. In particular, the first byte of the control word found in the 128th and 192nd basic frames of the current hyper-frame encodes the corresponding LTE eNodeB frame number. The Physical Broadcast Channel in the LTE also conveys a frame number related to this eNodeB frame sequence number. Typically, the most significant 8 bits of the 11 bit number encoded in the CPRI frames are found in the Physical Broadcast Channel.

Figure 11:
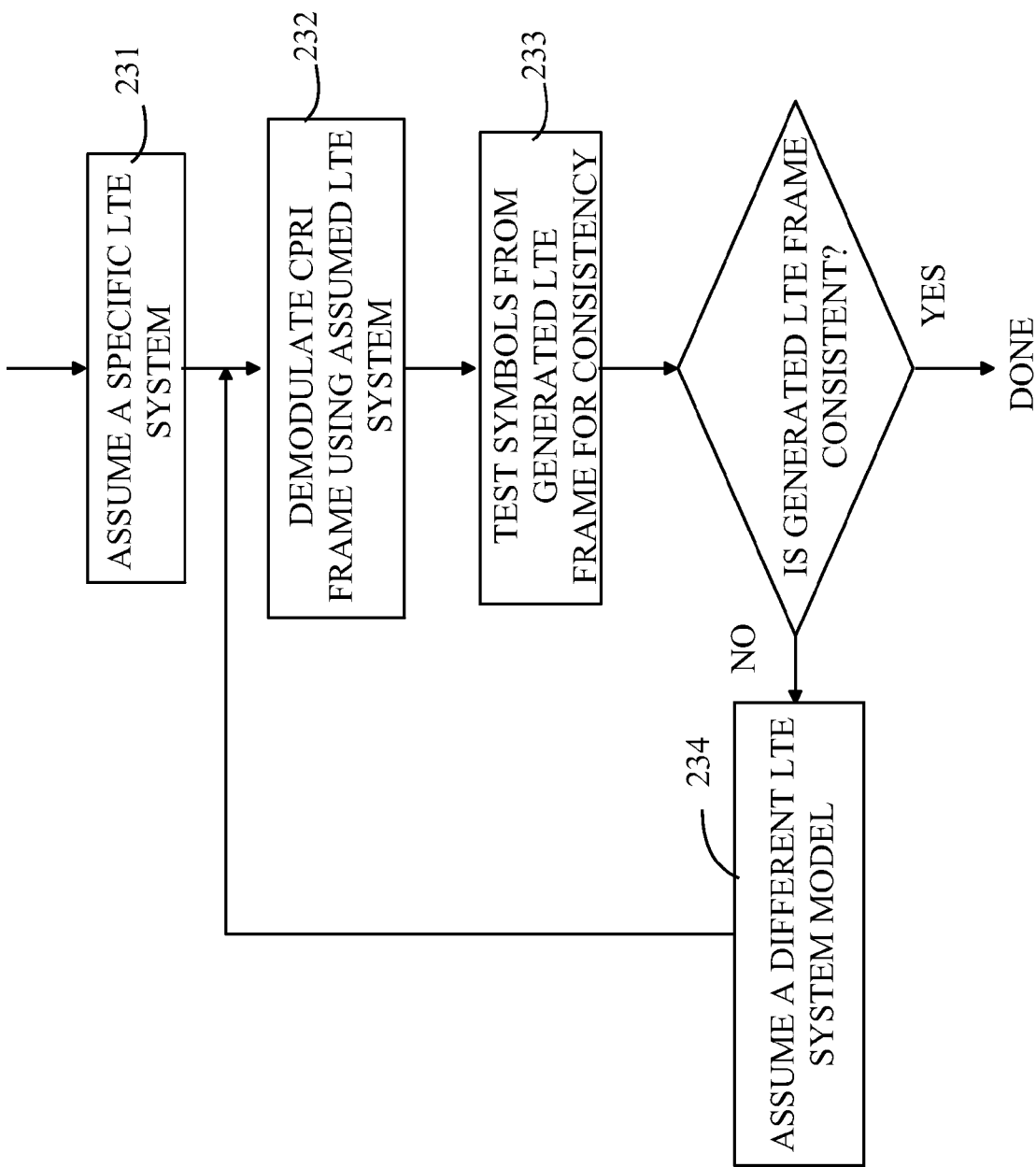
FIG. 11 illustrates the third step of the flow chart shown in FIG. 8.

Refer now to FIG. 11, which illustrates the third step of the flow chart shown in FIG. 8. The rest of the system parameters, such as the I and Q sample sizes, number of antenna carriers, LTE system bandwidth, etc. can only be determined through a trial and error process. That is, a configuration is assumed as shown at 231. The configuration is one of the possible configurations specifying each of the remaining parameters. The data from the CPRI frames are demodulated assuming the configuration as shown at 232. The contents of one or more known field values in the LTE frame are tested as shown at 233 to determine if the demodulated values are consistent with the LTE model. If the demoduled values resulting from the demodulation of the corresponding IQ values are not consistent with the known parameters or configuration, a new model is assumed and the process is repeated as shown at 234. If the demodulated values agree with the assumed model, it can be assumed that the remaining structures have been determined, and the process exits.

This process can be simplified by exploiting the known LTE structure and how it is marshaled onto the CPRI links. As noted above, the LTE frame number is encoded in the CPRI frames and in the resultant LTE frames at a known location. If the demodulated data for the resource elements that should contain the LTE frame number do not contain data consistent with the known value from the CPRI frames, the model being tested is inconsistent. In addition, for each possible LTE bandwidth, there are three LTE signals of interest that occupy the six RBs around the DC sub-carrier. Thus to determine these other system parameters one needs to collect the IQ samples making up these six RBs over slots 0 and 1 of the LTE frame and by trial and error of demodulation, decoding and correlation to determine the corresponding parameters.

For example, to discover all the antenna carriers, the process has to be repeated iteratively for each bandwidth over the recovered IQ values. Once the first antenna carrier has been discovered, the I and Q sample size and whether the I and Q bits are interleaved and the sample size of any other subsequent antenna carriers are also determined. Since the LTE signals are synchronous, multiplexing antenna carriers of different sizes or different bandwidths is not feasible. Hence, in one aspect of the invention, it is assumed that once the size of the first antenna carrier has been discovered, any other antenna carriers will be of the same sample size and will be used to support the same LTE bandwidth over the current CPRI link.

In some cases, the number of antenna carriers can be inferred by the presence of padding bytes in the records. For example, padding bytes are often inserted at the end of the record after the various antenna carrier data. Hence, finding an antenna carrier entry followed by a string of "0s" implies that the last antenna carrier entry has been discovered.

The algorithm for determining the LTE parameters involves postulating a model consisting of one of the possible configurations in terms of bandwidth, and CP. The parameters associated with that configuration are used to determine the location of the useful samples for a given symbol. An FFT is performed on the useful samples to arrive at a set of symbol values for each sub-carrier in the assumed model. Testing those symbol values will determine if the values are consistent with the model based on an LTE system having the assumed parameters. If the symbols are not consistent with the model, a different model is selected.

In determining if the model is consistent with the observed traffic, the reference/pilot sub-carriers and guard sub-carriers discussed above are useful. In addition, as noted above, the Physical Broadcast Channel conveys the frame sequence number or a number that can be computed therefrom, in a known slot. Hence, if this value is not found at the known location, the model is incorrect, and a new model must be assumed.

It should be noted that the discovery process of the present invention can be performed on line or off line on recorded data from the link between the REC and RE. The configuration parameters are expected to remain constant over long periods of time. Hence, the data can be searched using computational platforms that have significantly more computing power than those needed to monitor the transmission link once the configuration is known. The present invention can be practiced on any suitable computing platform that can acquire the frames on the CPRI link. Such platforms can include special purpose hardware for recording the transmissions between the REC and the RE.

Given a known configuration, a table can be constructed that provides the starting index in a CPRI frame for any particular symbol/sub-carrier in the LTE system. Hence, the monitoring system can rapidly extract the desired time IQ samples and recover the symbol in question. Since data transmissions are allocated in RBs having a plurality of adjacent frequency bands, the FFT that recovers all of the symbols at a given time location also supplies all of the symbols for the assigned RBs at that symbol time location.

The above-described embodiments have utilized an LTE communication system that transmits frames using CPRI frames. However, the method of the present invention can be applied to other communication systems that utilize CPRI frames. In general, the underlying communication system has its own broadcast frame structure that is incorporated into the CPRI frames. The communication system frames will be referred to as the broadcast frames in the following discussion. The broadcast frames are the frames that govern the communications between UE and the RE. For example, the broadcast frames for the LTE communication discussed above are shown in FIG. 4. The CPRI frames encapsulate the broadcast frames. However, the CPRI frame structure is not totally fixed across all systems and underlying communication systems. In addition, locating the beginning of each CPRI frame in the transmissions between the REC and RE also presents challenges. The present invention provides a mechanism for determining the start and length of each of the CPRI frames and a number of parameters that are related to the CPRI encapsulation so that the IQ data that defines the broadcast frames can be extracted.

The manner in which the data that is transmitted and received by the RE is packed into the CPRI frames can be different for different underlying communication systems. However, there are a finite number of possibilities for the broadcast frames and CPRI frames that encapsulate these broadcast frames once the CPRI frame characteristics that are independent of the communication system have been recovered from the control block in the CPRI frame. Typically, CPRI frame characteristics that are independent of a model are determined before a model of the communication system is selected to reduce the number of possible models that must be considered. The remaining configuration data is determined by selecting a model for the communication system and using that model to generate corresponding "candidate" broadcast frames from the recovered IQ baseband data in the CPRI frames. The model assumes an underlying communication system such as GSM, LTE, UMTS, etc. For each underlying communication system there will be a number of possible implementations.

The manner in which the broadcast frames are mapped to the CPRI frames also depends on the underlying communication system. For example, in a GSM system, 13 GSM broadcast frames are mapped on six CPRI frames. So the model must also assume one of the possible implementations in addition to the type of communication system. If the model is correct, the data in the candidate broadcast frames will be consistent with the communication system on which the model is based and the implementation of that communication system. If the model is not correct, the candidate broadcast frames will be inconsistent with the assumed communication system and implementation, and a new model must be chosen.

The manner in which consistency is determined will also depend on the underlying communication system. However, each communication system must present broadcast frames that are recognized by UE entering a cell. A UE entering a cell of a particular communication system must be able to detect the presence of the cell and synchronize itself to the RE in the cell. In general, each cell in a given communication system broadcasts frames that include a plurality of channels and time slots within those channels. Typically, one or more of those time slots in a predetermined channel of that communication system includes a synchronization code that is recognized by all UE capable of connecting to the cell that is broadcasting the broadcast frames.

In one aspect of the invention, once a model has been postulated, the corresponding broadcast frames are generated by the present invention from the IQ pairs in the CPRI frames. The corresponding channel and time slots associated with the synchronization code are then examined to determine if the expected synchronization code is present. If the synchronization code is not present, the model is inconsistent with the data in the CPRI frames, and hence, a new model must be chosen from the set of possible communication systems and implementations.

In LTE communication system model, the primary synchronization signal is located in the last OFDM symbol of the first time slot of the first sub-frame. This signal is referred to as the PSS in LTE communication systems. The LTE communication also provides a secondary synchronization signal (SSS). The SSS symbols are located in the same sub-frame as the PSS at predetermined locations within that sub-frame. Hence, decoding the sub-frame in question allows the present invention to examine the synchronization symbols. If the symbols are not consistent with the LTE model, a new model must be explored.

In UMTS communication system model, the UMTS broadcast frame size is 10 ms long; hence, one UMTS broadcast frame is transmitted in one CPRI frame. Unlike LTE, however, UMTS is not OFDM based. Instead each 10 ms radio frame is divided into 15 slots. Each slot is made up of 2560 pairs of IQ samples at a selected bit-width. The individual channels in the time slots are multiplexed using code division multiplexing rather than frequency division multiplexing.

Each time slot in a UMTS communication system has a number of separate channels that can be decoded. Two of these channels include codes that can be used to test the consistency of a particular model. These channels are referred to as the Primary and Secondary Synchronization Channels in UMTS. The Primary Synchronization Channel is a download channel that transmits an unscrambled known code during the first portion of each time slot. The same code is used by all the cells of a UMTS communication system so that a UE can easily detect the presence of a UMTS cell and synchronize itself with the cell. If this code is detected in the broadcast frame at the proper location in the time slots, the broadcast frame is consistent with a UMTS communication system.

The consistency of the model can be further tested in a UMTS communication system by looking at the contents of the Secondary Synchronization Channel. The Secondary Synchronization Code is limited to a known plurality of codes in a second channel of the broadcast frames. Hence, finding one of these codes further ensures consistency with the model. The specific secondary code provides the code group used for all the other channels. This code group is employed to correlate symbol-by-symbol and identify the "primary scrambling code" over the primary common pilot channel. On detecting this last code, one can decode the broadcast frames and the cell specific broadcast control channel information. Hence, testing for this second synchronization code also provides the implementation data needed for decoding specific time slots and channels.

A similar mechanism can be employed in GSM communication system model. The GSM broadcast frame structure utilizes time division multiplexing techniques and frequency division multiplexing techniques. The bandwidth is first divided into 124 parallel frequency channels of 200 KHz each, and these are shared using eight slots of time duration 577 microseconds. This timing and slot structure for frequency channels is very suitable for toll voice quality transmissions, for which GSM was originally intended. In simple terms a GSM broadcast frame is made up of eight slots with a total duration of 4.615 ms. The CPRI specification defines a mapping for GSM which involves 60 ms time period to allow clock synchronisation. Thus 13 GSM frames fit into six CPRI frames, ensuring that the first GSM frame is aligned with the first CPRI 10 ms frame.

For the purpose of the present invention, depending on the model's selected operating frequency, bit-width, and samples per basic frame, the IQ pairs representing the GSM broadcast frames can be extracted. The broadcast frames can be demodulated using Gaussian Minimum Shift Keying. After such decoding, each GSM broadcast frame will have been converted into its binary bit representation. GSM specification defines a set of "bursts" or packets that fit within a GSM slot. The standard defines four types of packets to include: access, synchronisation, normal, and frequency correction packets. These slot structures can be searched to identify and decode synchronisation bursts. Synchronisation packets are made up of a total of 148 bits and include tail bits, code bits, guard bits and data bits as defined by the standard. The data bits will carry the base station, cell, and zone identification as well as network access frequency. When recovered, these values can be correlated with information known about the system or transported in the CPRI synchronisation channel.

In another aspect of the invention, data in the control block of the CPRI frames that is specific to the underlying communication system and which constrains data in the broadcast frames is used as a consistency check by comparing the decoded data in the broadcast frames to the data predicted using the data in the control block. The eNodeB frame number that must be consistent with control word data in the CPRI frames that was discussed above with reference to LTE frames is an example of data that can be used to test consistency.

The present invention also includes a computer readable medium that stores instructions that cause a data processing system to execute the method of the present invention. A computer readable medium is defined to be any medium that constitutes patentable subject matter under 35 U.S.C. 101, and excludes any medium that does not constitute patentable subject mater under 35 U.S.C. 101. Examples of such media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a data processing system to determine one or more operational parameters of a communication system comprising an REC and an RE that communicate with one another over a data link utilizing a plurality of CPRI frames, said RE transmitting and receiving broadcast frames, said method comprising:
    copying said CPRI frames from said data link at a location between said REC and RE, said location being different from said REC and said RE;
    synchronizing said data processing system with said CPRI frames;
    determining a plurality of CPRI frame characteristics from said CPRI frames by examining a plurality of predetermined locations in said CPRI frames; and
    using said plurality of CPRI frame characteristics, one or more of said CPRI frames, and a first model of said communication system to provide a first broadcast frame that would be generated by said one or more CPRI frames if said first model accurately described said communication system; and
    testing said first broadcast frame to determine if said first broadcast frame is consistent with said first model, assuming that said first model accurately describes said operational parameters of said communication system.

2. The method of claim 1 wherein said CPRI frames comprise a first byte in a data stream on said data link, and wherein synchronizing said data processing system with said CPRI frames comprises:
    searching said CPRI frames for said first byte to determine a hyper-frame boundary; and
    examining predetermined locations relative to said first byte to determine a number of bytes between said hyper-frame boundary and said first byte of a subsequent CPRI frame on said data link.

3. The method of Claim I wherein said plurality of CPRI frame characteristics comprise CPRI frame characteristics that are independent of said first model, said CPRI frame characteristics that are independent of said first model being determined before testing said first broadcast frame.

4. The method of claim 3 wherein said CPRI frame characteristics that are independent of said first model comprises a CPRI line bit rate used in transmissions on said data link.

5. The method of Claim I wherein determining said plurality of CPRI frame characteristics includes determining a number of antenna carriers used in the communication system.

6. The method of claim 5 wherein determining the number of antenna carriers includes searching for a string of padding bytes within the one of the CPRI frames.

7. The method of claim 1 wherein providing said first broadcast frame comprises extracting IQ data values that depend on said first model from said one of said CPRI frames, and determining symbols specified by said extracted IQ data values that would be transmitted by said first broadcast frame if said first model accurately describes said communication system.

8. A method for operating a data processing system to determine one or more operational parameters of a communication system comprising an REC and an RE that communicate with one another over a data link utilizing a plurality of CPRI frames, said RE transmitting and receiving broadcast frames, said method comprising:

copying said CPRI frames from said data link at a location between said REC and RE, said location being different from said REC and said RE;

synchronizing said data processing system with said CPRI frames;

determining a plurality of CPRI frame characteristics from said CPRI frames by examining a plurality of predetermined locations in said CPRI frames; and using said plurality of CPRI frame characteristics, one or more of said CPRI frames, and a first model of said communication system to provide a first broadcast frame that would be generated by said one or more CPRI frames if said first model accurately described said communication system; and testing said first broadcast frame to determine if said first broadcast frame is consistent with said first model, assuming that said first model accurately describes said operational parameters of said communication system;

wherein providing said first broadcast frame comprises extracting IQ data values that depend on said first model from said one of said CPRI frames, and determining symbols specified by said extracted IQ data values that would be transmitted by said first broadcast frame if said first model accurately describes said communication system, wherein said determined symbols comprise synchronization symbols in said first broadcast frame that allow a UE in a cell transmitting said first broadcast frame to synchronize said UE with transmissions from said cell, and wherein testing said first broadcast frame comprises comparing said synchronization symbols in said first broadcast frame to values that depend on said first model.

9. The method of claim 8 wherein said first model comprises an LTE communication system model and wherein said synchronization symbols in said first broadcast frame comprise a primary synchronization signal in said LTE communication system model.

10. The method of claim 8 wherein said first model comprises a UMTS communication system model and wherein said synchronization symbols in said first broadcast frame comprises a code in a primary synchronization channel in said UMTS communication system model.

11. The method of claim 8 wherein said first model comprises a GSM communication system model and wherein said synchronization symbols in said first broadcast frame comprises a synchronization packets in said GSM communication system model.

12. The method of claim 1 wherein testing said first broadcast frame comprises determining symbols in said first broadcast frame and comparing said determined symbols with a value encoded in a control block in one of said CPRI frames.

13. The method of claim 12 wherein said first model defines an LTE communication system and wherein said determined symbols comprise an eNodeB frame number.

14. The method of claim 1 further comprising:
choosing a second model for said communication system, said second model being different from said first model when said testing determines that said first broadcast frame was not consistent with said first model;

using said plurality of CPRI frame characteristics, and said second model to provide a second broadcast frame that would be generated by said one or more CPRI frames if said second model accurately described said communication system; and testing said second broadcast frame to determine if said second broadcast frame is consistent with said second model.

15. The method of claim 1 wherein testing said first broadcast frame comprises:
defining a relationship between locations in said one or more CPRI frames and symbols in said first broadcast frame; and selectively decoding data in said one or more CPRI frames corresponding to a specified symbol location in said first broadcast frame without decoding data corresponding to a different symbol location in said first broadcast frame.

16. A non-transitory computer readable medium comprising instructions that cause a data processing system to execute a method for operating said data processing system to determine one or more operational parameters of a communication system comprising an REC and an RE that communicate with one another over a data link utilizing CPRI frames, said RE transmitting and receiving broadcast frames, said method comprising:

receiving a copy of said CPRI frames from said data link at a location between said REC and RE, said location being different from said REC and said RE;

synchronizing said data processing system with said CPRI frames;

determining a plurality of CPRI frame characteristics from said CPRI frames by examining a plurality of predetermined locations in said CPRI frames; and using said plurality of CPRI frame characteristics, one or more of said CPRI frames, and a first model of said communication system to provide a first broadcast frame that would be generated by said one or more CPRI frames if said first model accurately described said communication system; and testing said first broadcast frame to determine if said first broadcast frame is consistent with said first model, assuming that said first model accurately describes said operational parameters of said communication system.

17. The non-transitory computer readable medium of claim 16 wherein providing said first broadcast frame comprises extracting IQ data values that depend on said first model from said one of said CPRI frames, and determining symbols specified by said extracted IQ data values that would be transmitted by said first broadcast frame if said first model accurately describes said communication system.

18. The non-transitory computer readable medium of claim 17 wherein said determined symbols comprise synchronization symbols in said first broadcast frame that allow a UE in a cell transmitting said first broadcast frame to synchronize said UE with transmissions from said cell, and wherein testing said first broadcast frame comprises comparing said synchronization symbols in said first broadcast frame to values that depend on said first model.

19. The non-transitory computer readable medium of claim 16 wherein testing said first broadcast frame comprises determining symbols in said first broadcast frame and comparing said determined symbols with a value encoded in a control block in one of said CPRI frames.

20. The non-transitory computer readable medium of claim 16 wherein said plurality of CPRI frame characteristics comprise CPRI frame characteristics that are independent of said first model, said CPRI frame characteristics that are independent of said first model being determined before testing said first broadcast frame.

* * * * *